United States Patent [19]

Kumar et al.

[11] Patent Number: 5,349,004
[45] Date of Patent: Sep. 20, 1994

[54] FLUOROALKYL SILOXANE/VINYL COPOLYMER DISPERSIONS AND PRESSURE-SENSITIVE ADHESIVES HAVING IMPROVED SOLVENT RESISTANCE PREPARED THEREFROM

[75] Inventors: Ramesh C. Kumar, Maplewood; Albert I. Everaerts, Oakdale, both of Minn.; Yvan A. Bogaert, Gent, Belgium

[73] Assignee: Minnesota Mining and Manufacturing Company, St. Paul, Minn.

[21] Appl. No.: 947,141

[22] Filed: Sep. 18, 1992

[51] Int. Cl.⁵ ............................................. C08K 3/20
[52] U.S. Cl. .................................... 524/461; 524/263; 524/457; 524/506; 524/547; 524/770; 524/805; 524/806
[58] Field of Search ............... 524/263, 506, 806, 457, 524/458, 461, 805, 770, 547

[56] References Cited

U.S. PATENT DOCUMENTS

| | | | |
|---|---|---|---|
| Re. 24,906 | 12/1960 | Ulrich | 206/59 |
| 4,029,629 | 6/1977 | Jeram | 260/37 SB |
| 4,041,010 | 8/1977 | Jeram | 260/42.26 |
| 4,329,384 | 5/1982 | Vesley et al. | 428/40 |
| 4,330,590 | 5/1982 | Vesley | 428/336 |
| 4,433,007 | 2/1984 | Marwitz et al. | 524/506 X |
| 4,529,752 | 7/1985 | Bluestein | 523/214 |
| 4,562,223 | 12/1985 | Steinberger et al. | 524/506 |
| 4,585,848 | 4/1986 | Evans et al. | 528/15 |
| 4,599,374 | 7/1986 | Bluestein | 523/213 |
| 4,657,965 | 4/1987 | Watanabe et al. | 524/506 |
| 4,737,559 | 4/1988 | Kellen et al. | 526/291 |
| 4,778,862 | 10/1988 | Woo et al. | 525/479 |
| 4,791,163 | 12/1988 | Traver et al. | 524/506 |
| 4,847,137 | 7/1989 | Kellen et al. | 428/195 |
| 4,942,202 | 7/1990 | Zama et al. | 525/104 |
| 5,194,501 | 3/1993 | Babu et al. | 524/506 X |

FOREIGN PATENT DOCUMENTS

| | | |
|---|---|---|
| 0075191 | 3/1983 | European Pat. Off. . |
| 0385443 | 9/1990 | European Pat. Off. . |
| 0390207 | 10/1990 | European Pat. Off. . |
| A2105983 | 4/1972 | France . |
| WOA92/207-51 | 11/1992 | Int'l Pat. Institute . |
| 61-31411 | 2/1986 | Japan . |
| 63-117085 | 5/1988 | Japan . |

OTHER PUBLICATIONS

Search report and Annex.

*Primary Examiner*—Judy M. Reddick
*Attorney, Agent, or Firm*—Gary L. Griswold; Walter N. Kirn; Janice L. Dowdall

[57] ABSTRACT

Novel pressure-sensitive adhesives are described which show significant resistance to solvents and working fluids such as jet fuel, hydraulic fluid, de-icing fluid and the like. Adhesive compositions comprise nonaqueous dispersions of copolymers of acrylic monomers prepared in the presence of a vinyl-substituted fluoroalkyl siloxane having the general formula I and a macromonomeric stabilizer. The adhesives prepared from the adhesive compositions exhibit excellent adhesion to glass, aluminum, and low surface-energy materials such as fluoroalkyl siloxane elastomers.

The fluoroalkyl siloxane has the formula

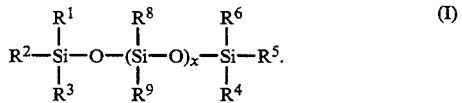

9 Claims, No Drawings

FLUOROALKYL SILOXANE/VINYL COPOLYMER DISPERSIONS AND PRESSURE-SENSITIVE ADHESIVES HAVING IMPROVED SOLVENT RESISTANCE PREPARED THEREFROM

FIELD OF THE INVENTION

This invention relates to stable, fluoroalkyl siloxane/-vinyl copolymer dispersions which provide pressure-sensitive adhesives having improved solvent resistance especially against solvents such as gasoline, jet fuel, hydraulic fluid, and oils. The invention also relates to the solvent resistant pressure-sensitive adhesives (PSAs) prepared therefrom.

BACKGROUND OF THE INVENTION

Acrylate pressure-sensitive adhesives are well-known. U.S. Pat. No. Re 24,906 (Ulrich), assigned to the assignee of the present case, discloses alkyl acrylate copolymers which comprise a major amount of alkyl esters of acrylic acid, having from 4 to 14 carbon atoms and which comprise a minor amount (i.e. 3 to 12%, preferably 4 to 8%) of a polar, copolymerizable monomer, such as acrylic acid. Such adhesives are widely popular, as they are readily available, and provide a good balance of tack, shear, and peel properties on a variety of substrates at relatively low cost. However, such adhesives can experience poor solvent resistance and poor adhesion to low energy surfaces, such as polyolefins, silicones, and fluorosilicones.

It is well-known that the use of tackifiers in acrylic PSA formulations enhances the adhesion of the PSAs to low energy surfaces. However, this increase in adhesion occurs at the expense of internal strength.

A need has existed for acrylic adhesives having improved solvent resistance, especially against such fluids as gasoline, jet fuel, hydraulic fluid, and oils. Two main approaches have been tried to achieve this goal. One approach involved the modification of the acrylic polymer backbone. The other approach involved the combination of two elastomers in a hybrid adhesive composition.

EP 0,075,191 (1981), assigned to Daikin Kogyo, describes a solution polymer of pentafluoropropyl acrylates which when coated on polyester yields a tape which experiences less than a 10% adhesion loss when exposed to oil, gasoline, kerosene, and water. This adhesive requires expensive fluorinated acrylate monomers and does not include a second elastomer as part of the composition.

Fluoroelastomers have been incorporated into adhesive compositions in an attempt to yield adhesives having improved solvent resistance. JP 61-314 11 (1986), assigned to Suriibondo, describes a radically polymerizable composition comprising (meth)acrylate or oligomer thereof, fluoroelastomer, and a curing agent. The cured composition which demonstrates improved heat-resistance and oil-resistance can be used as an adhesive and a caulking material. The fluoroelastomers used are vinylidene fluoride/hexafluoropropylene copolymers and the adhesives are ultraviolet light (UV) or anaerobically cured. No disclosure is made of fluoroalkyl siloxane elastomers. JP 63-117085 (1988), assigned to Central Glass, discloses a tacky adhesive comprising a copolymer of vinylidene fluoride and hexafluoroacetone combined with a copolymer of 2-ethylhexyl acrylate and vinyl acetate. The adhesive is purported to be weather and oil resistant. Again, no fluoroalkyl siloxane elastomer was included in the composition. EP 0,390,207 (1990), assigned to Daikin Industries, discloses a vibration damping material obtained by dissolving an amorphous fluorine-containing polymer into acrylic monomer and polymerizing the monomer with or without permitting the resulting polymer to form an interpenetrating polymer network. The composition is reported to provide excellent damping, solvent resistance, oil resistance, and weathering resistance, however, no pressure sensitive adhesive properties are taught.

A need thus exists for an inexpensive pressure sensitive adhesive that is resistant to solvents and adheres well to low energy surfaces, with a balance of tack, adhesion and fluid resistance. We have discovered such a pressure-sensitive adhesive.

BRIEF DESCRIPTION OF THE INVENTION

We have discovered that the copolymerization of certain acrylic monomers with a sufficient amount of a fluoroalkyl siloxane elastomer in the presence of a stabilizer results in a pressure sensitive adhesive composition which can be used in forming a PSA having an excellent balance of tack, adhesion, and solvent resistance. An additional benefit is good adhesion to unprimed fluoroalkyl siloxane elastomers.

The present invention provides an adhesive composition comprising a novel stable, fluoroalkyl siloxane/vinyl nonaqueous copolymer dispersion which comprises the polymerization product of a mixture comprising the following components:

(a) about 5 to about 40 parts by weight of a fluoroalkyl siloxane of the formula

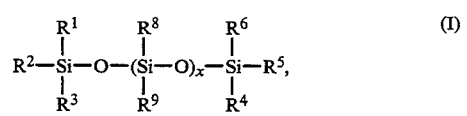

wherein:

R$^9$ is independently selected from the group consisting of —CH$_2$CH$_2$R$_f$ and —R$^7$, R$_f$ is a fluoroalkyl group independently selected from the group consisting of C$_m$F$_{2m-1}$ and C$_n$F$_{(2n+1)-q}$H$_q$, m is an integer ranging from about 1 to about 20;

n is an integer ranging from about 1 to about 20;

q is an integer ranging from about 0 to about 2n;

x is an integer of about 11 or greater;

the fluoroalkylsiloxane comprises 10 or greater —CH$_2$CH$_2$R$_f$ groups;

the fluoroalkylsiloxane comprises at least 1 R$^7$ group;

wherein R$^1$, R$^2$, R$^3$, R$^4$, R$^5$, R$^6$, and R$^8$ are each independently selected from the group consisting of alkyl groups comprising about 1 to about 12 carbon atoms, aralkyl, alkaryl, alkoxy, alkylamino, hydroxyl, fluoroalkyl, and hydrogen; and R$^7$ is an organic group comprising at least two carbon atoms wherein at least 1 olefinic moiety is contained within R$^7$;

wherein the ratio of R$^7$ to —CH$_2$CH$_2$R$_f$ is such that the mole percent of the olefinic moiety content contributed by R$^7$ of the fluoroalkyl siloxane is between about 0.1 and about 4;

Co) about 60 to about 95 parts by weight of free radically polymerizable monomer, wherein the free-radically polymerizable monomer comprises:

(i) about 1 to about 20 percent by weight of free radically polymerizable polar monomer; and (ii) about 80 to about 99 percent by weight of free radically polymerizable non-polar monomer;

wherein the weight percentages of (i) and (ii) are based upon the total weight of (i) plus (ii); and wherein the total weight of (a) plus (b) equals 100 parts by weight total;

(c) about 0.1 to about 1 part by weight of a free radical initiator based upon 100 parts by weight total of (a) plus (b);

(d) about 2 to about 10 parts by weight of a stabilizer based upon 100 parts by weight of total of (a) plus (b) wherein the stabilizer has a number average molecular weight ranging from about 8000 to about 25,000 and wherein the stabilizer is selected from the group consisting of:

(i) a copolymer comprising (A) about 40 to about 60 parts by weight of monomer selected from the group consisting of vinyl esters of $C_1$ to $C_8$ monocarboxylic acids and $C_1$ to $C_{12}$ alkyl (meth)acrylates, and (B) about 60 to about 40 parts by weight of monomer selected from the group consisting of N-vinylpyrrolidone, acrylamide, N,N-dimethylacrylamide, N-vinylcaprolactam, and mixtures thereof, wherein the copolymer comprises 100 parts by weight total of the monomers of (i)(A) plus (i)(B); and (C) about 0.5 to about 5 weight percent of a chain transfer agent based upon the weight of the monomers of (i)(A) plus (i)(B);

(ii) a macromonomer comprising the reaction product of the copolymer of (d)(i), wherein the chain transfer agent selected provides the copolymer with at least one functional group selected from the group consisting of $-NH_2$, $-COOH$, $-OH$, and combinations thereof, with an endcapping agent selected from the group consisting of isocyanatoethyl methacrylate, alpha, alpha-dimethyl-meta-isopropenyl benzylisocyanate, para(chloromethyl) styrene, vinyl azlactone, glycidyl methacrylate, and mixtures thereof, wherein at least about 95% of the functional group(s) selected from the group consisting of $-NH_2$, $-COOH$, $-OH$, and combinations thereof, of the copolymer are reacted with the endcapping agent; and (iii) mixtures thereof; and (e) about 30 to about 95 percent by weight of an organic solvent based upon the total weight of (a) plus (b) plus (c) plus (d) plus (e).

Also provided by the present invention are compositions, which upon cure provide adhesives having even greater resistance to jet fuel, engine oil, hydraulic fluid, brake fluid or similar materials, wherein the compositions comprise the fluoroalkyl siloxane/vinyl nonaqueous dispersions and a compatible crosslinker.

The novel fluoroalkyl siloxane/vinyl copolymer compositions of the present invention provide, upon cure, a balance of fluid resistance and adhesion to glass, aluminum, polyolefins and/or fluoroalkyl siloxane elastomers. Compared to "all-acrylic" and silicone/acrylic materials known in the art, the adhesives of the present invention demonstrate improved adhesion to fluorosilicone elastomeric materials.

DETAILED DESCRIPTION OF THE INVENTION

Fluoroalkyl Siloxanes

Fluoroalkyl siloxanes of Formula I are useful in the present invention. $R^1$, $R^2$, $R^3$, $R^4$, $R^5$, $R^6$, and $R^8$ are each preferably independently selected from the group consisting of alkyl groups comprising about 1 to about carbon atoms, most preferably about 1 to about 3 carbon atoms. Such fluoroalkyl siloxanes are preferred in that elastomers made therefrom typically provide optimum solvent and heat resistance and low temperature flexibility, whereas elastomers made from fluorosilicone gums comprising larger groups, i.e., $C_4$ or higher, may tend to have lower solvent and heat resistance and decreased low temperature flexibility. Furthermore, fluorosilicone gums having such larger groups typically tend to be more expensive.

$R^7$ represents an organic group comprising at least two, typically two to nine carbon atoms, and containing at least one olefinic moiety (i.e., $R^7$ contains at least 1 ethylenically unsaturated functional group such as a vinyl segment). In reference to $R^7$, the term "olefinic moiety" refers to carbon atoms bonded via a double bond(s) and atoms pendant therefrom. Examples of monovalent moieties include but are not limited to $-CH=CH_2$, $-CH=CH-$, etc. For example, if $R^7$ comprises $-CH_2-CH_2CH=CH-CH_2-CH=CH_2$ there are two olefinic moieties contained therein: $-CH=CH-$ and $-CH=CH_2$. As another example, when $R^7$ comprises $-CH_2-CH_2-CH=CH_2$, the olefinic moiety portion is considered to be $-CH=CH_2$. As another example, when $R^7$ comprises $-CH_2CO_2CH=CH_2$ the olefinic moiety portion is considered to be $-CH=CH_2$. Preferably, the unsaturated bond is terminally-located since terminally-located bonds typically provide for faster cure rates. When $R^7$ comprises more than two carbon atoms, non-terminally-located bonds within the group may be ethylenically-unsaturated. However, such bonds typically tend to be less reactive due to the relatively sterically-hindered position of such bonds. Elastomers formed by curing compositions containing fluoroalkyl siloxanes wherein the $R^7$ group comprises more than nine carbon atoms may tend to have lower solvent and heat resistance.

The letter x represents an integer of 11 or greater, typically x represents an integer of about 11 to about 5500.

In order to form a copolymer useful as a fluid-resistant adhesive a fluoroalkyl siloxane of Formula I should be used wherein the fluoroalkyl siloxane contains 10 or greater $-CH_2CH_2R_f$ groups in order to provide a distinct fluoroalkyl siloxane phase to the copolymer, preferably about 2000 to about 3500 $-CH_2CH_2R_f$ groups, in order to provide adequate fluid-resistance characteristics to the copolymer while improving adhesion to low-energy surfaces (such as silicones, fluoroalkyl-silicones, polyolefins, etc.).

The ratio of $R^7$ to $-CH_2CH_2R_f$ is such that the mole percent of olefinic or vinyl moiety content is between about 0.1 and about 4, preferably between about 1 and about 2. Compositions wherein the olefinic or vinyl moiety content of the fluoroalkyl siloxane is substantially lower than these ranges may phase separate to give a smaller number of grafts resulting in a heterogeneous solution. Those compositions wherein the olefinic or vinyl moiety content of the fluoroalkyl siloxane is substantially higher than this range may result in cross-linking of the copolymer.

Fluoroalkyl siloxanes useful in preparing the compositions of the present invention typically have a weight average molecular weight between about 200,000 and about 700,000, preferably between about 250,000 and about 650,000, as determined by gel permeation chromatography. Elastomers cured from compositions made with fluoroalkyl siloxanes having molecular weights substantially below these ranges may tend to have lower tensile strength. Compositions may be made with fluoroalkyl siloxanes having molecular weights higher than these ranges. However, such compositions will typically have higher solution viscosities, thereby tending to reduce the ease of processability and application to the desired substrate. Such high molecular weight fluoroalkyl siloxanes also exhibit reduced compatibility in the present formulation. The fluorine content of the fluoroalkyl siloxanes useful in the present invention is typically at least about 20 weight percent, preferably at least about 30 weight percent based upon the weight of the fluoroalkyl siloxanes. If the fluorine content of the fluoroalkyl siloxane is too low the solvent resistance of the resultant elastomer may tend to be reduced, for instance the elastomer may tend to swell to a greater extent.

The number of olefinic moieties contained within the fluoroalkyl siloxane can vary. The weight ratio of the olefinic moieties of the fluoroalkyl siloxane to the total weight of the fluoroalkyl siloxane typically ranges from about 0.5:99.5 to about 3:97. Preferably, the weight ratio ranges from about 0.5:99.5 to about 1:99.

The fluoroalkyl siloxanes useful in the present invention can be prepared by any known method including, for example, those described in U.S. Pat. Nos. 4,029,629; 4,041,010; 4,529,752; 4,585,848; and 4,599,374; all incorporated by reference herein. Examples of fluoroalkyl siloxanes useful in the present invention include but are not limited to the following fluoroalkyl siloxanes available from the Dow Corning Company: Silastic ® LS-2840, LS-2860, LS-2249U, and LS-2332U. An example of a preferred fluoroalkyl siloxane is trifluoropropyl methyl siloxane containing 0.1 to 1.0 mole % vinyl sites (i.e., olefinic moiety content).

Free-radically Polymerizable Monomers

Representative examples of free-radically polymerizable nonpolar monomers having at least one ethylenically unsaturated polymerizable group include but are not limited to those monomers selected from the group consisting of alkyl acrylates, preferably monofunctional unsaturated acrylate esters of primary or secondary alkyl alcohols, the molecules of which comprise from about 1 to about 14 carbon atoms, and mixtures thereof. Examples of specific nonpolar monomers include but are not limited to those selected from the group consisting of isooctyl acrylate, isononyl acrylate, 2-ethylhexyl acrylate, decyl acrylate, dodecyl acrylate, n-butyl acrylate, hexyl acrylate, mixtures thereof, and the like. Preferred nonpolar monomers include those selected from the group consisting of isooctyl acrylate, butyl acrylate, 2-ethylhexyl acrylate, and mixtures thereof, which monomers provide the best adhesive properties.

Representative examples of free-radically polymerizable polar monomers having at least one ethylenically unsaturated polymerizable group which are copolymerizable with the nonpolar monomers include strongly polar copolymerizable monomers including but not limited to those selected from the group consisting of acrylic acid, itaconic acid, hydroxyalkyl acrylates, cyanoalkyl acrylates, acrylamides, and substituted acrylamides, and moderately polar copolymerizable monomers including but not limited to those selected from the group consisting of N-vinylpyrrolidone, acrylonitrile, mixtures thereof, and the like.

The preferred monomers include those selected from the group consisting of isooctyl acrylate, 2-ethylhexyl acrylate, n-butyl acrylate, acrylic acid, itaconic acid, N-vinylpyrrolidone, acrylonitrile, and mixtures thereof. Most preferably, the monomers comprise a mixture of isooctyl acrylate, acrylic acid, and N-vinyl pyrrolidone.

The adhesive composition of the invention comprises about 5 to about 40 parts by weight fluoroalkyl siloxane and about 60 to about 95 parts by weight free radically polymerizable monomer, preferably about 10 to about 30 parts by weight fluoroalkyl siloxane and about 70 to about 90 parts by weight free radically polymerizable monomer, and most preferably about 15 to about 25 parts by weight fluoroalkyl siloxane and about 75 to about 85 parts by weight free radically polymerizable monomer, based upon 100 parts by weight total of fluoroalkyl siloxane and free radically polymerizable monomer.

The free radically polymerizable monomer typically comprises about 1 to about 20 percent by weight polar monomer and about 80 to about 99 percent by weight nonpolar monomer, preferably about 5 to about 15 percent by weight polar monomer and about 85 to about 95 percent by weight nonpolar monomer, most preferably about 8 to about 12 percent by weight polar monomer and about 85 to about 92 percent by weight nonpolar monomer, based on the total weight of free radically polymerizable monomer.

Stabilizer

A third component is a stabilizer for the nonaqueous dispersion of the invention. The stabilizer can comprise a copolymer comprising a) about 40 to about 60 parts by weight of monomer selected from the group consisting of vinyl esters of $C_1$ to $C_8$ monocarboxylic acids and $C_1$ to $C_{12}$ alkyl (meth)acrylates, and b) about 60 to about 40 parts by weight of monomer selected from the group consisting of N-vinylpyrrolidone, acrylamide, N,N-dimethylacrylamide, N-vinylcaprolactam, and mixtures thereof wherein the stabilizer comprises 100 parts by weight total of monomer, and wherein the stabilizer has a number average molecular weight ranging from about 8,000 to about 25,000. Optionally, the random copolymer may be reacted with end-capping monomers (preferably an equimolar amount) to form a macromonomer, the end-capping monomers including but not limited to those selected from the group consisting of isocyanatoethyl methacrylate (IEM) and alpha, alpha-dimethylisopropenyl benzylisocyanate (TMI), vinyl azlactone, para(chloromethyl) styrene, glycidyl methacrylate, and mixtures thereof through —OH, —NH$_2$, or —COOH functionality or combinations thereof, which may be introduced to the copolymer through a chain transfer agent. At least about 95% of the free hydroxyl (—OH), amine (—NH$_2$), carboxyl (—COOH) groups, or combinations thereof, preferably at least about 98% of the free hydroxyl, amine, carboxyl groups, or combinations thereof, and most preferably about 100% of the free hydroxyl, amine, carboxyl groups, or combinations thereof, of the copolymer are reacted with end-capping agent. End-capping introduces ethylenically-unsaturated free-radically polymerizable functional groups into the random copolymer such that the end-capped macromonomer can be copolymerized with the fluoroalkyl siloxane and the free-radically polymerizable monomers of the present invention as described above. Preferred stabilizers include those selected from the group consisting of vinyl acetate/N-vinyl pyrrolidone copolymer endcapped with IEA and vinyl acetate/N-vinyl pyrrolidone copolymer endcapped with TMI, and mixtures thereof. Most preferably, vinyl acetate/N-vinylpyrrolidone copolymer endcapped with isocyanatoethyl methacrylate is selected as the stabilizer due to its ease of synthesis and the facility with which it is copolymerized with the fluoroalkyl siloxane and free-radically polymerizable monomers present in the adhesive composition of the present invention.

The copolymer stabilizer can be prepared by combining the desired monomers, initiator (such as those discussed below), a chain transfer agent such as —OH, —NH$_2$, or —COOH functional chain transfer agent selected from the group consisting of chain transfer agents which provide the copolymer with —OH functionality (e.g., mercaptoethanol), chain transfer agents which provide the copolymer stabilizer with —COOH functionality (e.g., mercapto acetic acid), chain transfer agents which provide the copolymer stabilizer with —NH$_2$ functionality (e.g., mercaptoamine), and mixtures thereof, and a conventional organic solvent such as ethyl acetate (and/or those discussed below) in a reaction vessel. In cases where the copolymer stabilizer is not to be reacted with an end-capping agent, a non-functional chain transfer agent can be used such as iso-octyl thioglycolate, carbon tetrabromide, and the like. Typically about 20 to about 50 parts by weight of monomer is used. Typically about 0.5 to about 5 weight % of chain transfer agent is used based on the weight of the monomer charge. Typically about 80 to about 50 parts by weight of solvent is used. Polymerization is conducted under inert atmospheric conditions, with agitation, for about 10 to 24 hours.

A macromonomer stabilizer can be prepared by reacting the copolymer with end-capping agent in the presence of a catalyst such as dibutyl tin dilaurate. Typically about 0.03 to about 0.15 weight % of catalyst is used based on the weight of the end-capping agent. Also about 0.01 to about 0.1 weight % of a conventional antioxidant such as Irganox ™ 1010 (available from Ciba-Geigy) based on the monomer charge is included. The reaction preferably is conducted under inert atmospheric conditions with agitation for about 1 to about 5 hours.

A stable nonaqueous dispersion is obtained only if a stabilizer having a number average molecular weight ranging from about 8,000 to about 25,000 is used. If the molecular weight is too high, the nonaqueous dispersion initially formed becomes unstable over time and is unusable as a coating. If the stabilizer is not added before polymerization occurs, a separate fluoroalkyl siloxane and a separate acrylate phase is obtained (i.e., a heterogeneous coating solution). Therefore, the stabilizer is an essential part of the formulation. The stabilizer is typically included at about 2 to about 10 parts by weight, preferably from about 3 to about 6 parts by weight, most preferably about 4 to about 5 parts by weight, based upon 100 parts by weight total of the free-radically polymerizable monomer plus fluoroalkyl siloxane.

Initiators

Examples of useful free-radical initiators according to the present invention are detailed in Chapters 20 and 21 of Macromolecules, Vol.2, 2nd Ed., H. G. Elias, Plenum Press, 1984, New York, incorporated by reference herein. Useful thermal initiators for purposes of the present invention include, but are not limited to, those selected from the group consisting of the following: azo compounds such as 2,2'-azobis-(isobutyronitrile), dimethyl-2,-2'-azo-bis-isobutyrate, azo-bis-(diphenyl methane), 4,4'-azo-bis-(4-cyanopentanoic acid); peroxides such as benzoyl peroxide, cumyl peroxide, tert-butyl peroxide, cyclohexanone peroxide, glutaric acid peroxide, lauroyl peroxide, methyl ethyl ketone peroxide and hydrogen peroxide; hydroperoxides such as tert-butyl hydroperoxide and cumene hydroperoxide; peracids such as peracetic acid and perbenzoic acid; potassium persulfate; peresters such as diisopropyl percarbonate; and mixtures thereof. Certain of these initiators (in particular the peroxides, hydroperoxides, peracids, and peresters) can be induced to decompose by addition of a suitable catalyst rather than thermally. This redox method of initiation is described in Elias, Chapter 20.

Useful photochemical initiators include but are not limited to those selected from the group consisting of benzoin ethers such as diethoxyacetophenone, oximino-ketones, acylphosphine oxides, diaryl ketones such as benzophenone and 2-isopropyl thioxanthone, benzil and quinone derivates, and 3-ketocumarines as described by S.P. Pappas, *J. Rad. Cur,*, July 1987, p. 6, incorporated by reference herein.

Preferably, the initiator used comprises a thermally decomposed azo or peroxide compound for solubility reasons and in order to control the reaction rate. Most preferably, the initiator used comprises 2,2'-azobis-(isobutyronitrile) for reasons of cost and appropriate decomposition temperature.

The adhesive composition of the invention comprises about 0.1 to about 1 part by weight initiator, preferably about 0.2 to about 0.8 part by weight, most preferably about 0.3 to about 0.5 part by weight, based upon 100 parts by weight total of fluoroalkyl siloxane and free radically polymerizable monomer.

Solvent

An organic solvent is utilized in the polymerization process of the invention in order to decrease the viscosity during the reaction to allow for efficient stirring and heat transfer. The organic solvent used in the free radical polymerization can be any organic liquid which is essentially inert to the reactants and which will not otherwise adversely affect the reaction.

Suitable solvents include but are not limited to polar solvents such as those selected from the group consisting of esters such as ethyl acetate and butyl acetate; ketones such as methyl ethyl ketone, methyl isobutyl ketone, methyl propyl ketone, acetone; and mixtures thereof.

Other solvent systems are useful as well. Aliphatic and aromatic hydrocarbons can be used, although, sometimes they lead to the precipitation of the vinyl polymeric segment from solution. Hydrocarbon solvents may be used when admixed with other polar solvents which help control the molecular weight of the final copolymer.

The solvent utilized in the free radical polymerization, may be any substance which is liquid in a temperature range of about −10° C. to about 110° C., does not interfere with the energy source or catalyst used to dissociate the initiator to form free radicals, is inert to the reactants and product and will not otherwise adversely affect the reaction. The organic solvent selected is capable of dissolving the fluoroalkyl siloxane, monomer, stabilizer, and initiator to form a mixture. The amount of solvent used is generally about 30 to about 95 percent by weight based on the total weight of the reactants (i.e., fluoroalkyl siloxane, polar monomer, non-polar monomer, initiator, stabilizer) plus solvent. Preferably, the amount of solvent utilized ranges from about 40 to about 50 percent by weight, most preferably about 35 to 40 percent by weight based upon the total weight of the reactants plus solvent in order to obtain fast reaction times and high molecular weight of the polymer at appropriate product viscosities.

Methods of Polymerization

The homolytic decomposition of the initiator used in the present invention to form free radicals can be induced by heat energy (thermolysis), light energy (photolysis), or the addition of a suitable catalyst. The decomposition rate of the initiator during thermolysis depends upon the chemical nature of the initiator, the reaction temperature, and the solvent used. The decomposition rate of the initiator during photolysis depends mainly upon the chemical nature of the initiator and the intensity and wavelength of the radiation utilized.

Light energy can be supplied to induce the homolytic decomposition of the initiator by means of visible or ultraviolet sources including low intensity fluorescent black light lamps, medium pressure mercury are lamps, and germicidal mercury lamps. The selection of a preferred light energy source will depend upon the chosen photoinitator.

The decomposition of the initiator can also be accomplished by using a suitable catalyst. Catalyst induced initiator decomposition involves an electron transfer mechanism resulting in a reduction-oxidation (redox) reaction. Initiators such as peroxides and hydroperoxides are more susceptible to this kind of decomposition. Catalysts useful in inducing the homolytic decomposition of the initiator include, but are not limited to those selected from the group consisting of amines and metal ions used in combination with peroxide or hydroperoxide initiators and bisulfite or mercapto compounds used in combination with persulphate initiators.

The preferred method of initiation is thermolysis which can be readily employed in standard reactors. Thermolysis also provides for ease of control of the reaction rate and exotherm.

The free-radically polymerizable monomers, the initiator, the stabilizer, the fluoroalkyl siloxane, and the solvent employed are charged into an appropriate reaction vessel in order to form a mixture. If photolysis is conducted to decompose the initiator, the reactants and any solvent employed are charged into an energy source transparent vessel and therein subjected to the energy source. If the energy source is ultraviolet light radiation, a suitable ultraviolet light-transparent vessel is utilized.

If thermolysis is used to decompose the initiator, the reactants and solvent employed are charged into a suitable glass or metal reactor, and therein subjected to the thermal energy source. If catalysis is used to decompose the initiator, a glass or metal reactor can also be utilized.

The reaction is preferably conducted in a vessel with agitation to permit uniform exposure of the reactants to the energy source. While most of the reactions have been conducted by employing a batch process, it is possible to utilize the same technology in a continuous polymerization operation.

Reaction times on the order of about 1 to about 40 hours have been found typical, depending upon the amount and type of solvent used, the amount and type of initiator used, temperatures or photolytic energy supplied, and the nature of the free radically polymerizable monomers.

Optional Additives

The adhesive composition of the invention can be blended with one or more compatible modifiers in order to optimize physical properties. For example, it may be desirable to include an additive selected from the group consisting of pigments, extenders, conducting material, various polymeric additives, and mixtures thereof. It is theorized that the copolymer contained in the dispersion made in the practice of the present invention can be recovered by standard procedures such as evaporation of solvent, or precipitation after polymerization into water or a suitable organic solvent such as methanol, hexane, etc. It is theorized that standard extraction techniques may also be used if desired. It is also theorized that the copolymer may also be taken or inverted into a different solvent either by a solvent exchange process, e.g. by adding a higher boiling solvent and then distilling out the low boiling solvent or by azeotropic distillation, a technique well known in the art.

The fluid-resistant pressure-sensitive adhesive composition of the present invention may comprise the defined copolymer dispersion alone or may, we theorize, comprise the copolymer dispersion blended with a compatible homopolymer, copolymer, etc. The low percentage of fluoroalkyl siloxane polymeric segment contained in the copolymer dispersion makes this fluoroalkyl siloxane/vinyl copolymer dispersion readily compatible, for purposes of blending, with other polymers whose composition is similar to the vinyl polymeric segment. In addition, there are several pairs of dissimilar polymers that yield compatible blends due to specific interactions as described by S. Krause in *Polymer Blends*, Academic Press, New York, 1978, incorporated by reference herein.

The fluoroalkyl siloxane/vinyl copolymer dispersions of the present invention can be used for a variety of applications, such as preparing fluid-resistant adhesives and sealants, form-in-place multipurpose gasketing compounds, etc. The fluoroalkyl siloxane/vinyl copolymer stable nonaqueous dispersions are particularly useful for making a fluid-resistant pressure-sensitive adhesive.

A dispersion composition capable of providing a PSA having even greater solvent resistance can be prepared by adding a crosslinker to the dispersion. Thus, a dispersion composition capable of forming adhesives having even greater fluid resistance can be made by adding from about 0.1% to about 0.5% by weight of a crosslinker into the stable fluoroalkyl siloxane/vinyl copolymer nonaqueous dispersion, based upon the percent solids (i.e., fluoroalkyl siloxane, free-radically polymerizable monomer, initiator, and stabilizer). Examples of useful crosslinkers include but are not limited to thermally-activated, moisture-activated, and ultraviolet radiation (UV) activated crosslinkers. Examples of thermally-activated crosslinkers include but are not limited to those selected from the group consisting of multifunctional aziridine amides such as N,N'-bis-1,2-propyleneterephthalamide, metal complexes such as aluminum acetylacetonate, metal ions such as $Zn^{2+}$, $Zr^{2+}$, and $Ni^{2+}$, which can be provided in the form of soluble metal salts, and isocyanates such as H-12MDI (4,4'-methylene-bis-[cyclohexylisocyanate]). Examples of moisture-activated crosslinkers include but are not limited to those selected from the group consisting of silanes such as trimethoxysilylpropyl methacrylate (Tris), amino silane, epoxy silane, and mixtures thereof. Examples of UV-activated crosslinkers include but are not limited to those selected from the group consisting of triazines as described in U.S. Pat. No. 4,330,590 (Vesley, 3M) and U.S. Pat. No. 4,329,384 (Vesley et al., 3M) and copolymerizable aromatic ketone monomers as described in U.S. Pat. No. 4,737,559 and U.S. Pat. No. 4,847,137 (Kellen et at., 3M), all of which are incorporated by reference herein.

The preferred weight ratio of vinyl polymeric segment to fluoroalkyl siloxane polymeric segment of the present copolymer dispersion ranges from about 60:40 to about 95:5, in order to allow for a wide range of fluid-resistant performance while still maintaining good adhesion to various substrates.

For improved fluid-resistant properties the copolymer can be crosslinked by standard methods well known in the art, such as radiation curing (electron beam or ultraviolet light) or chemical curing.

The above-described nonaqueous dispersion can be coated onto substrates such as silicone coated paper liner, polyethylene terephthalate film, fluorosilicone backing, etc., by any conventional coating means such as Meyer rod, gravure, ruling mills, etc. The coated substrates are typically dried and cured by heating to a temperature of about 65° C. for about 15 to about 30 minutes.

| | Abbreviations and Tradenames |
|---|---|
| VAc | Vinyl acetate |
| NVP | N-vinyl pyrrolidone |
| LPM | liter-per-minute |
| IEM | isocyanato ethyl methacrylate |
| DBTL | Dibutyl tin dilaurate |
| MEK | Methyl ethyl ketone |
| IOA | Isooctyl acrylate |
| AA | Acrylic acid |
| Hrs | Hours |
| Alum. | Aluminum |
| FSi | Fluorosilicone |
| VAZO ™-64 | 2,2'-azobis(isobutyronitrile) available from duPont |
| Irganox ™ 1010 | pentaerythritol, tetrakis [3-(3,5-di-tert-butyl-4-hydroxyphenyl)proprionate] antioxidant, from Ciba Geigy Company |
| LS-2860 | A fluoroalkyl silicone elastomer available from Dow Corning Co. (weight average molecular weight of approximately 490,000, olefinic moiety content of about 0.6 mole %) |
| Ex. | Example |

TEST METHODS

Molecular Weight Determination

The characterization of the molecular weight distribution of the polymers described herein has been by conventional gel permeation chromatography (GPC). A Hewlett-Packard Model 1084B high performance liquid chromatograph equipped with Styragel ™ columns was used. The system was calibrated using polystyrene standards. All molecular weight averages are polystyrene equivalent molecular weights. The molecular weight averages were calculated according to accepted practices. GPC test methods are further explained in "Modem Size Exclusion Liquid Chromatography", *Practice of Gel Permeation Chromatography*, John Wiley, New York, 1979, incorporated by reference herein.

Peel Adhesion (Reference: ASTM D3330-78 PSTC-1 (11/75))

Peel adhesion is the force required to remove a coated flexible sheet material from a test panel measured at a specific angle and rate of removal. In the examples, this force is expressed in Newtons per 100 mm (N/100 ram) width of coated sheet. The procedure followed is:

1. A 12.5 mm width of the coated sheet is applied to the horizontal surface of a clean glass or aluminum test plate with at least 12.7 lineal cm in firm contact. A hard rubber roller is used to apply the strip.

2. The free end of the coated strip is doubled back nearly touching itself so the angle of removal will be 180°. The free end is attached to the adhesion tester scale.

3. The glass test plate is clamped in the jaws of a tensile testing machine which is capable of moving the plate away from the scale at a constant rate of 2.3 meters per minute.

4. The scale reading in Newtons is recorded as the tape is peeled from the glass surface. The data is reported as the range of numbers observed during the test.

EXAMPLES

The following non-limiting examples further illustrate the present invention. All parts, percentages, ratios, etc. in the examples and the rest of the specification are by weight unless otherwise indicated.

EXAMPLE 1

Synthesis of VAc/NVP Copolymer Stabilizer 14.0 g NVP, 10.84 g VAc, 0.8 g mercaptoethanol, 0.12 g VAZO ™ 64 and 41.4 g ethyl acetate were charged into a 130 ml. amber bottle. The resulting solution was purged with $N_2$ for 2 minutes at the rate of 1 LPM. The bottle was sealed and tumbled in a constant temperature bath at 65° C. for 17 hours.

EXAMPLE 2

Capping of VAc/NVP Copolymer with IEM to Prepare Macromonomer Stabilizer

To the polymer solution obtained in Example 1, 1.2 g IEM, 0.25 g DBTL and approximately 0.13 g of Irganox ™ 1010 was added and the resulting solution was purged with $N_2$ for 2 minutes at the rate of 1 LPM. The bottle was sealed and tumbled in a constant temperature bath at 55° C. for 3 hours. IR analysis showed complete capping.

EXAMPLES 3-13

The fluoroalkyl siloxane LS-2860 (available from Dow Corning Corporation) was charged at 20 to 30% into a series of bottles containing MEK and dissolved in order to form thick syrups. To the resulting thick syrups were added various ratios of IOA/AA or IOA/AA/NVP monomers. In addition, VAc/NVP capped macromonomer or uncapped copolymer stabilizer was added to the syrups. The syrups were then diluted to 40% solids with MEK containing VAZO ™ 64 initiator. The resulting solutions were purged with N2 for 2 minutes at the rate of 1 LPM and tumbled for 20-24 hours in a constant temperature bath at 65° C. Specifics of these formulations are presented in Table I. Percentage solids showed 97-99% conversion.

CONTROL EXAMPLE A

The procedure of Examples 3-13 was followed except that stabilizer was not included. Specifics of the formulation are presented in Table I. Percentage solids showed 97-99% conversion.

CONTROL EXAMPLE B

The procedure of Examples 3-13 was followed except that fluoroalkyl siloxane was not included. Specifics of the formulation are presented in Table I. Percentage solids showed 97-99% conversion.

TABLE I

| Example | LS-2860 | g IOA | g AA | g NVP | g VAc/NVP Stabilizer | g MEK | g VAZO-64 |
|---|---|---|---|---|---|---|---|
| Control Ex. A | 12.0 | 25.2 | 2.8 | — | — | 61.0 | 0.24 |
| 3 | 12.0 | 25.2 | 2.9 | — | 4.0$^2$ | 61.0 | 0.24 |
| 4 | 12.0 | 26.0 | 2.0 | — | 4.0$^2$ | 60.0 | 0.24 |
| 5 | 12.0 | 26.6 | 1.4 | — | 4.0$^2$ | 65.0 | 0.24 |
| 6 | 6.0 | 21.6 | 0.96 | 1.44 | 3.0$^2$ | 46.0 | 0.18 |
| 7 | 6.0 | 22.1 | 0.50 | 1.44 | 3.0$^2$ | 47.0 | 0.18 |
| 8 | 6.0 | 21.6 | 1.44 | 0.50 | 3.0$^2$ | 46.0 | 0.18 |
| 9 | 6.0 | 21.1 | 1.44 | 1.44 | 3.0$^2$ | 46.0 | 0.18 |
| 10 | 6.0 | 21.6 | 1.44 | 0.96 | 3.0$^2$ | 45.0 | 0.18 |
| 11 | 6.0 | 20.6 | 1.92 | 1.63 | 3.0$^2$ | 45.0 | 0.18 |
| 12 | 6.0 | 20.2 | 2.40 | 1.44 | 3.0$^2$ | 45.0 | 0.18 |
| 13 | 6.0 | 21.6 | 1.44 | 0.96 | 3.0$^1$ | 45.0 | 0.18 |
| Control Ex. B | — | 45.0 | 3.0 | 2.0 | — | 70.0 | 0.24 |

$^1$Uncapped VAc/NVP copolymer prepared according to Example 1.
$^2$Capped VAc/NVP macromonomer prepared according to Example 2.

Control Example A yielded phase separated material, and was thus rejected for further evaluation.

The purpose of Example 13 was to determine the effect of uncapped VAc/NVP stabilizer on polymerization. A homogeneous solution was obtained after the polymerization whether capped or uncapped VAc/NVP stabilizer was used.

EXAMPLE 14

The procedure of Examples 3-13 was repeated. The charges were as follows: fluoroalkyl silicone LS-2860 (5.0 g), n-butyl acrylate (18.0 g), acrylic acid (1.2 g), N-vinyl pyrrolidone (0.8 g), IEM-capped vinyl acetate/N-vinyl pyrrolidone (2.5 g @ 36.9% solids), Vazo ™ 64 (0.15 g), and methyl ethyl ketone (37.5 g). Percentage solids showed 97-99% conversion.

EXAMPLE 15

The procedure of Examples 3-13 was repeated. The charges were as follows: fluoroalkyl silicone LS-2860 (5.0 g), 2-ethylhexyl acrylate (18.0 g), acrylic acid (1.2 g), N-vinyl pyrrolidone (0.8 g), IEM-capped VAc/NVP (2.5 g 36.9% solids), Vazo$^{TM}$ 64 (0.15 g) and methyl ethyl ketone (37.5 g). Percentage solids showed 97-99% conversion.

EXAMPLE 16

The procedure of Examples 3-13 was repeated. The charges were as follows: fluoroalkyl silicone LS-2860 (5.0 g), ethyl acrylate (18.0 g), acrylic acid (1.2 g), N-vinyl pyrrolidone (0.8 g), IEM-capped VAc/NVP (2.5 g @ 36.9% solids), Vazo@ 64 (0.15 g), and methyl ethyl ketone (37.5 g). Percentage solids showed 97-99% conversion.

EXAMPLE 17

The procedure of Examples 3-13 was repeated. The charges were as follows: fluoroalkyl silicone LS-2860 (5.0 g), isooctyl acrylate (18.0 g), acrylic acid (1.2 g), N-vinyl pyrrolidone (0.8 g), IEM-capped VAc/NVP (2.5 g 36.9% solids), Vazo ™ 64 (0.15 g) and methyl ethyl ketone (37.5 g). Percentage solids showed 97-99% conversion.

Tape Preparation and Adhesion Tests

The approximately 40% solids solutions of Examples 3-12 and 14-17 were coated on corona-treated polyethylene terephthalate films after adding 0.3 weight percent bisamide (N,N'-bis-1,2-propyleneterephthalamide) curing agent to each solution based upon the weight of the solution. The coated films were dried and cured in an air-forced oven at 65° C. for 15 to 20 minutes and stored in a constant-temperature and constant-humidity room for 24 hours. Results for adhesion to glass, aluminum and fluorosilicone backing are shown in Table II. The data contained in Table II demonstrates that the adhesive of the invention exhibits good to excellent adhesion to glass, aluminum, and fluorosilicone backing material when compared to Control B (which does not contain a fluorosiloxane polymeric segment). Control Example B (IOA/AA/NVP) shows adhesion of 9.8 N/din to fluorosilicone backing material, compared to 44 N/din for the adhesive of Example 17.

Solvent-Resistance Tests

The approximately 40% solids solutions of Examples 9, 10, 14, 15, 17, and Control Example B were coated onto corona-treated polyethylene terephthalate film after adding 0.3 weight percent bisamide curing agent to each solution, based upon the weight of the solution. One-half inch strips (1.27 cm) of the PET tapes coated with adhesive were laminated to aluminum plates then aged at constant temperature and humidity as above. Adhesion to aluminum was determined as above for half of the samples, and the other half were soaked in various fluids, as noted in Table III for three hours then tested for peel adhesion. Comparative results reported in Table III show that the fluorosiloxane-containing adhesives of the present invention retain superior adhesion to aluminum after soaking in fluids as described. After soaking in JP-4 jet fuel (available from the Shell Oil Company) for 3 hours, Control Example B showed adhesion loss of more than 80%, while Example 17 showed adhesion loss of only 3%. Tapes soaked in hydraulic fluid or engine oil did not leave any residue on removal from aluminum test panels while tapes soaked in JP-4 jet fuel or deicing fluid left only trace amounts of residue on removal from the panels.

The deicing fluid used was 02143 TEXACO Aircraft De-Icing Fluid WD-30, available from the TEXACO Lubricants Company, Houston, Texas. WD-30 comprises 80 to 95% 1,2-ethanediol and 4 to 11% deionized water. The hydraulic fluid used was 01537 Aircraft Hydraulic Oil 15, available from Texaco, Inc. The hydraulic fluid comprises 65 to 80% petroleum oil, 20 to 35% methacrylate polymer, less than 1% triaryl phosphate, and less than 1% ditertiarybutyl phenol. The engine oil used was Turbo Oil 2380, which is a synthetic aviation lubricant, available from EXXON Company, U.S.A. The engine oil comprises 100% polyol esters and proprietary additives. JP-4 jet fuel refers to an industry standard jet fuel which is available commercially from a number of sources.

TABLE II

| Example | Adhesion* to Glass (N/dm) | Adhesion* to Aluminum (N/dm) | Adhesion* to Fluorosilicone (N/dm) |
|---|---|---|---|
| 3 | 8.8 | 61.4 | 21.6 |
| 4 | 25.1 | 30.4 | 40.7 |
| 5 | 32.6 | 41.1 | 36.3 |
| 6 | 56.3 | 55.9 | 34.3 |
| 7 | 36.5 | 41.1 | 30.6 |
| 8 | 58.1 | 53.0 | 36.7 |
| 9 | 55.9 | 52.4 | 32.3 |
| 10 | 56.8 | 59.0 | 41.8 |
| 11 | — | 41.6 | — |
| 12 | — | 16.7 | — |
| 14 | 59.4 | 55.2 | 56.2 |
| 15 | 53.0 | 49.7 | 40.3 |
| 16 | 7.5 | 2.4 | 4.8 |
| 17 | 49.0 | 41.4 | 44.0 |
| Control Ex. B | 70.3 | 71.2 | 9.8 |

*Adhesions are measured at 2.3 m/min. (180° peel)

TABLE III

| | Adhesion Before* Soaking in a Fluid (N/dm) | | Adhesion to Aluminum After* Soaking in a Fluid for 3 Hrs (N/dm) | | | |
|---|---|---|---|---|---|---|
| Ex. | Glass | Alum. | Jet Fuel | De-Icing Fluid | Hydraulic Fluid | Engine Oil |
| 9 | 55.9 | 52.4 | 46.9 (No residue) (10% loss) | 44.7 (15%) | 51.9 (0.8%) | 52.6 (No loss) |
| 10 | 56.8 | 59.0 | 47.5 (19.4% loss) | 46.9 (20%) | 55.2 (6.0%) | 54.8 (7%) |
| 14 | 59.4 | 55.2 | 51.3 (7% loss, residue) | — | — | — |
| 15 | 53.0 | 49.7 | 45.5 (8.5%) | — | — | — |
| 17 | 49.0 | 41.4 | 40.1 (3.1%) | — | — | — |
| B (Control) (IOA/AA/NVP) | 70.3 | 71.2 | 13.2 (82%) | 18.7 (75%) | — | — |

() Shows the loss in adhesion after the tape laminated on aluminum has been soaked in a fluid for 3 hours
*Adhesions are measured at 2.3 m/min. (180° peel)

While this invention has been described in connection with specific embodiments, it should be understood that it is capable of further modification. The claims herein are intended to cover those variations which one skilled in the art would recognize as the chemical equivalent of what has been described here.

What is claimed:
1. An adhesive composition comprising:
a dispersion comprising the polymerization product of a mixture comprising:
(a) about 5 to about 40 parts by weight of a fluoroalkyl siloxane of the formula

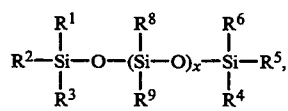

wherein:

$R^9$ is independently selected from the group consisting of $-CH_2CH_2R_f$ and $-R^7$,
$R_f$ is a fluoroalkyl group independently selected from the group consisting of $C_mF_{2m-1}$ and $C_nF_{(2n+1)-q}H_q$;
m is an integer ranging from about 1 to about 20;
n is an integer ranging from about 1 to about 20;
q is an integer ranging from about 0 to about 2n;
x is an integer of about 11 or greater;
the fluoroalkylsiloxane comprises 10 or greater $-CH_2CH_2R_f$ groups;
the fluoroalkylsiloxane comprises at least 1 $R^7$ group;
wherein $R^1$, $R^2$, $R^3$, $R^4$, $R^5$, $R^6$, and $R^8$ are each independently selected from the group consisting of alkyl groups comprising about 1 to about 12 carbon atoms, aralkyl, alkaryl, alkoxy, alkylamino, hydroxyl, fluoroalkyl, and hydrogen; and
$R^7$ is an organic group having at least two carbon atoms wherein at least 1 olefinic moiety is contained within $R^7$;
wherein the ratio of $R^7$ to $-CH_2CH_2R_f$ is such that the mole percent of the olefinic moiety content contributed by $R^7$ of the fluoroalkyl siloxane is between about 0.1 and about 4;
(b) about 60 to about 95 parts by weight of free radically polymerizable monomer, wherein the free-radically polymerizable monomer comprises:
(i) about 1 to about 20 percent by weight of free radically polymerizable non-polar monomer;
wherein the weight percentages of (i) and (ii) are based upon the total weight of (i) plus (ii); and wherein the total weight of (a) plus (b) equals 100 parts by weight total;
(c) about 0.1 to about 1 part by weight of a free radical initiator based upon 100 parts by weight total of (a) plus (b);
(d) about 2 to about 10 parts by weight of a stabilizer based upon 100 parts by weight of total of (a) plus (b) wherein said stabilizer has a number average molecular weight ranging from about 8000 to about 25,000 and wherein said stabilizer is selected from the group consisting of:
(i) a copolymer comprising (A) about 40 to about 60 parts by weight of monomer selected from the group consisting of vinyl esters of $C_1$ to $C_8$ monocarboxylic acids and $C_1$ to $C_{12}$ alkyl (meth)acrylates, and (B) about 60 to about 40 parts by weight of monomer selected from the group consisting of N-vinylpyrrolidone, acrylamide, N,N-dimethylacrylamide, N-vinylcaprolactam, and mixtures thereof wherein said copolymer stabilizer comprises 100 parts by weight total of the monomers of (i) (A) plus (i) (B); and (C) about 0.5 to about 5 weight percent of a chain transfer agent based upon the weight of the monomers of (i) (A) plus (i) (B);

(ii) a macromonomer comprising the reaction product of the copolymer of (d) (i) wherein said chain transfer agent selected provides said copolymer with at least one functional group selected from the group consisting of —NH$_2$, —COOH, —OH, and combinations thereof, with an end-capping agent selected from the group consisting of isocyanatoethyl methacrylate, alpha, alphadimethyl-meta-isopropenyl benzylisocyanate, vinyl azlactone, para(chloromethyl) styrene, glycidyl methacrylate, and mixtures thereof, wherein at least about 95% of the functional groups selected from the group consisting of —HN$_2$, —COOH, —OH, and combinations thereof, of the copolymer are reacted with the endcapping agent; and (iii) mixtures thereof; and (e) about 30 to about 95 percent by weight of an organic solvent based upon the total weight of (a) plus (b) plus (c) plus (d) plus (e).

2. An adhesive composition comprising:
a dispersion comprising the polymerization product of a mixture comprising:

(a) about 10 to about 30 parts by weight of a fluoroalkyl siloxane of the formula

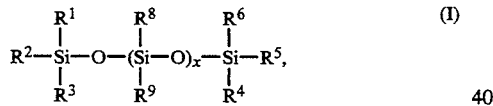

wherein:

R$^9$ is independently selected from the group consisting of —CH$_2$CH$_2$R$_f$ and —R$^7$, R$_f$ is a fluoroalkyl group independently selected from the group consisting of C$_m$F$_{2m-1}$ and C$_n$F$_{(2n+1)-q}$H$_q$;

m is an integer ranging from about 1 to about 20;

n is an integer ranging from about 1 to about 20;

q is an integer ranging from about 0 to about 2m;

x is an integer of about 11 or greater;

the fluoroalkylsiloxane comprises 10 or greater —CH$_2$CH$_2$R$_f$ groups;

the fluoroalkylsiloxane comprises at least 1 R$^7$ group;

wherein R$^1$, R$^2$, R$^3$, R$^4$, R$^5$, R$^6$, and R$^8$ are each independently selected from the group consisting of alkyl groups comprising about 1 to about 12 carbon atoms, aralkyl, alkaryl, alkoxy, alkylamino, hydroxyl, fluoroalkyl, and hydrogen; and R$^7$ is an organic group having at least two carbon atoms wherein at least 1 olefinic moiety is contained within R$^7$;

wherein the ratio of R$^7$ to —CH$_2$CH$_2$R$_f$ is such that the mole percent of the olefinic moiety content contributed by R$^7$ of the fluoroalkyl siloxane is between about 0.1 and about 4;

(b) about 70 to about 90 parts by weight of free-radically polymerizable monomer, wherein said free radically polymerizable monomer comprises:
(i) about 5 to about 15 percent by weight of free-radically polymerizable polar monomer; and
(ii) about 85 to about 95 percent by weight of free-radically polymerizable non-polar monomer;
wherein said weight percentages of (i) and (ii) are based upon the total weight of (i) plus (ii); and wherein the total weight of (a) plus (b) equals 100 parts by weight total;

(c) about 0.2 to about 0.8 parts by weight of a free radical initiator based upon 100 parts by weight total of (a) plus (b);

(d) about 3 to about 6 parts by weight of a stabilizer based upon 100 parts by weight of total of (a) plus (b) wherein said stabilizer has a number average molecular weight ranging from about 8000 to about 25,000 and wherein said stabilizer is selected from the group consisting of:
(i) a copolymer comprising (A) about 40 to about 60 parts by weight of monomer selected from the group consisting of vinyl esters of C$_1$ to C$_8$ monocarboxylic acids and C$_1$ to C$_{12}$ alkyl (meth)acrylates, and (B) about 60 to about 40 parts by weight of monomer selected from the group consisting of N-vinylpyrrolidone, acrylamide, N,N-dimethylacrylamide, N-vinylcaprolactam, and mixtures thereof wherein said copolymer stabilizer comprises 100 parts by weight total of the monomer of (i) (A) plus (i) (B); and (C) about 0.5 to about 5 weight percent of a chain transfer agent based upon the weight of the monomers of (i) (A) plus (i) (B);

(ii) a macromonomer comprising a reaction product of the copolymer of (d) (i) wherein said chain transfer agent selected provides said copolymer with at least one functional group selected from the group consisting of —NH$_2$, —COOH, —OH, and combinations thereof with an end-capping agent selected from the group consisting of isocyanatoethyl methacrylate, alpha, alpha-dimethyl-meta-isopropenyl benzylisocyanate, vinyl azlactone, para(chloromethyl)styrene, glycidyl methacrylate, and mixtures thereof, wherein at least about 95% of the functional group(s) selected from the group consisting of —NH$_2$, —COOH, —OH, and combinations thereof, of the copolymer are reacted with the end-capping agent; and (iii) mixtures thereof; and (e) about 40 to about 50 percent by weight of an organic solvent based upon the total weight of (a) plus (b) plus (c) plus (d) plus (e).

3. An adhesive composition comprising:
a dispersion comprising the polymerization product of a mixture comprising:
(a) about 15 to about 25 parts by weight of a fluoroalkyl siloxane of the formula

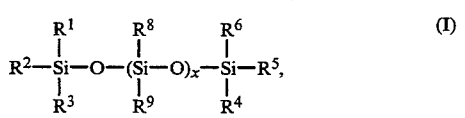

wherein:

$R^9$ is independently selected from the group consisting of —CH$_2$CH$_2$R$_f$ and —R$^7$, R$_f$ is a fluoroalkyl group independently selected from the group consisting of C$_m$F$_{2m-1}$ and C$_n$F$_{(2n+1)-q}$H$_q$;

m is an integer ranging from about 1 to about 20;

n is an integer ranging from about 1 to about 20;

q is an integer ranging from about 0 to about 2n;

x is an integer of about 11 or greater;

the fluoroalkylsiloxane comprises 10 or greater —CH$_2$CH$_2$R$_f$ groups;

the fluoroalkysiloxane comprises at least 1 R$^7$ group;

wherein R$^1$, R$^2$, R$^3$, R$^4$, R$^5$, R$^6$, and R$^7$ group;

wherein R$^1$, R$^2$, R$^3$, R$^4$, R$^5$, R$^6$, and R$^8$ are each independently selected from the group consisting of alkyl groups comprising about 1 to about 12 carbon atoms, aralkyl, alkaryl, alkoxy, alkylamino, hydroxyl, fluoroalkyl, and hydrogen; and R$^7$ is an organic group having at least two carbon atoms wherein at least 1 olefinic moiety is contained within R$^7$;

wherein the ratio of R$^7$ to —CH$_2$CH$_2$R$_f$ is such that the mole percent of the olefinic moiety content contributed by R$^7$ of the fluoroalkyl siloxane is between about 0.1 and about 2; and wherein said fluoroalkyl siloxane has a weight average molecular weight of about 250,000 to about 600,000, and a fluorine content of at least about 30 weight percent;

(b) about 75 to about 85 parts by weight of free-radically polymerizable monomer, wherein said free-radically polymericable monomer comprises:

(i) about 8 to about 12 percent by weight of free-radically polymerizable polar monomer; and (ii) about 85 to about 92 percent by weight of free-radically polymerizable non-polar monomer;

wherein said percentages of (i) plus (ii) are based upon the total weight of (i) plus (ii); and wherein the total weight of (a) plus (b) equals 100 parts by weight total;

(c) about 0.3 to about 0.5 parts by weight of a free radical initiator based upon 100 parts by weight total of (a) plus (b);

(d) about 4 to about 5 parts by weight of a free radical initiator based upon 100 parts by weight of total of (a) plus (b) wherein said stabilizer has a number average molecular weight ranging from about 8000 to about 25,000 and wherein said stabilizer is selected from the group consisting of:

(i) a copolymer comprising (A) about 40 to about 60 parts by weight of monomer selected from the group consisting of vinyl esters of C$_1$ to C$_8$ monocarboxylic acids and C$_1$ to C$_{12}$ alkyl (meth)acrylates, and (B) about 60 to abut 40 parts by weight of monomer selected from the group consisting of N-vinylpyrrolidone, acrylamide, N,N-dimethylacrylamide, N-vinylcaprolactam, and mixtures thereof wherein said copolymer comprises 100 parts by weight total of monomers of (i) (A) plus (i) (B); and (C) about 0.5 to about 5 weight percent of a chain transfer agent based upon the weight of the monomers of (i) (A) plus (I) (B);

(ii) a macromonomer comprising the reaction product of the copolymer of 1(d) (i) wherein said chain transfer agent selected provides said copolymer with at least one functional group selected from the group consisting of —NH$_2$, —COOH, —OH, and combinations thereof, with an end-capping agent selected from the group consisting of isocyanatoethyl methacrylate, alpha, alpha-dimethyl-meta-isopropenyl benzylisocyanate, vinyl azlactone, para(-chloromethyl)styrene, glycidyl methacrylate, and mixtures thereof, such that at least about 95% of the functional group(s) selected from the group consisting of —NH$_2$, —COOH, —OH, and combinations thereof, of the copolymer are reacted with the endcapping agent; and (iii) mixtures thereof; and (e) about 35 to about 40 percent by weight of an organic solvent based upon the total weight of (a) plus (b) plus (c) plus (d) plus (e).

4. The adhesive composition of claim 1 wherein said nonpolar monomer is selected from the group consisting of acrylate esters of primary alcohols, the molecules of which comprise from about 1 to about 14 carbon atoms and have one ethylenically unsaturated polymerizable group, acrylate esters of secondary alcohols, the molecules of which comprise from about 1 to about 14 carbon atoms and have one ethylenically unsaturated polymerizable group, and mixtures thereof.

5. The adhesive composition of claim 1 wherein said polar monomer is selected from the group consisting of acrylic acid, itaconic acid, hydroxy alkyl acrylates, cyanoalkyl acrylates, acrylamides, substituted acrylamides, N-vinyl pyrrolidone, acrylonitrile, and mixtures thereof.

6. The adhesive composition of claim 1 wherein said non-polar monomer is selected from the group consisting of isooctyl acrylate, isononyl acrylate, 2-ethylhexyl acrylate, decyl acrylate, dodecyl acrylate, n-butyl acrylate, hexyl acrylate, and mixtures thereof.

7. The adhesive composition of claim 1 wherein said nonpolar monomer is selected from the group consisting of isooctyl acrylate, butyl acrylate, 2-ethylhexyl acrylate, and mixtures thereof.

8. The adhesive composition of claim 1 wherein said macromonomer is selected from the group consisting of vinyl acetate/N-vinyl pyrrolidone copolymer endcapped with isocyanatoethyl methacrylate, and vinyl acetate/N-vinyl pyrrolidone copolymer endcapped with alpha, alpha-dimethylisopropenyl benzylisocyanate, and mixtures thereof.

9. The composition of claim 1 wherein said fluoroalkyl siloxane comprises about 2000 to about 3500 —CH$_2$CH$_2$R$_f$ groups.

* * * * *

UNITED STATES PATENT AND TRADEMARK OFFICE
CERTIFICATE OF CORRECTION

PATENT NO.: 5,349,004

DATED: September 20, 1994

INVENTOR(S): Ramesh C. Kumar et al.

It is certified that error appears in the above-identified patent and that said Letters Patent is hereby corrected as shown below:

Col. 2, line 66, "Co)" should be --(b)--.
Col. 3, line 7, "Co)" should be --(b)--.
Col. 14, line 37, "N/din" should be --N/dm--.
Col. 14, line 38, "N/din" should be --N/dm--.
Col. 16, line 30, "non-polar monomer;" should be --polar monomer; and--.
Col. 16, line 49, insert the following before the paragraph beginning at line 50: --(ii) about 80 to about 99 percent by weight of free radically polymerizable non-polar monomer;--.
Col. 17, line 23, "-HN$_2$," should be -- -NH$_2$,--.
Col. 17, line 50, "2m;" should be --2n;--.
Col. 19, line 14, delete line 14 beginning with "wherein" and ending with "group;".
Col. 19, line 33, "polymericable" should be --polymerizable--
Col. 19, lines 45-46, delete "free radical initiator" and replace with --stabilizer--.
Col. 19, line 55, "abut" should be --about--.
Col. 20, line 4, "(I)" should be --(i)--.

Signed and Sealed this

Eighteenth Day of June, 1996

Attest:

BRUCE LEHMAN

*Attesting Officer*  *Commissioner of Patents and Trademarks*